March 1, 1960 — A. T. C. BURROWS — 2,926,771
FLOOR CONVEYORS
Filed June 27, 1957

# United States Patent Office 2,926,771
Patented Mar. 1, 1960

2,926,771

FLOOR CONVEYORS

Arthur Thomas Charles Burrows, Stevenage, England, assignor to Geo. W. King Limited, Stevenage, England, a British company Application June 27, 1957, Serial No. 669,405

Claims priority, application Great Britain June 28, 1956

2 Claims. (Cl. 198—181)

This invention relates to floor conveyors of the kind having tracks over which trucks provided with non-swivelling wheels can be drawn by means of a driven chain disposed between the tracks and adapted for releasable connection with the trucks.

The main object of this invention is to provide in floor conveyors means to facilitate the negotiation of the trucks in such conveyors around comparatively sharp track bends, which sometimes have to be provided, to conform the conveyor to the space available.

Accordingly, the invention provides, in a floor conveyor of the kind specified having at least one appreciable bend in the track, the combination of ramp means disposed between the tracks around the bend area and roller means mounted beneath a truck, preferably near the center of gravity of the truck, and arranged to run over the ramp means to take the main weight of the truck off the wheels while the bend is being negotiated.

Figure 1:
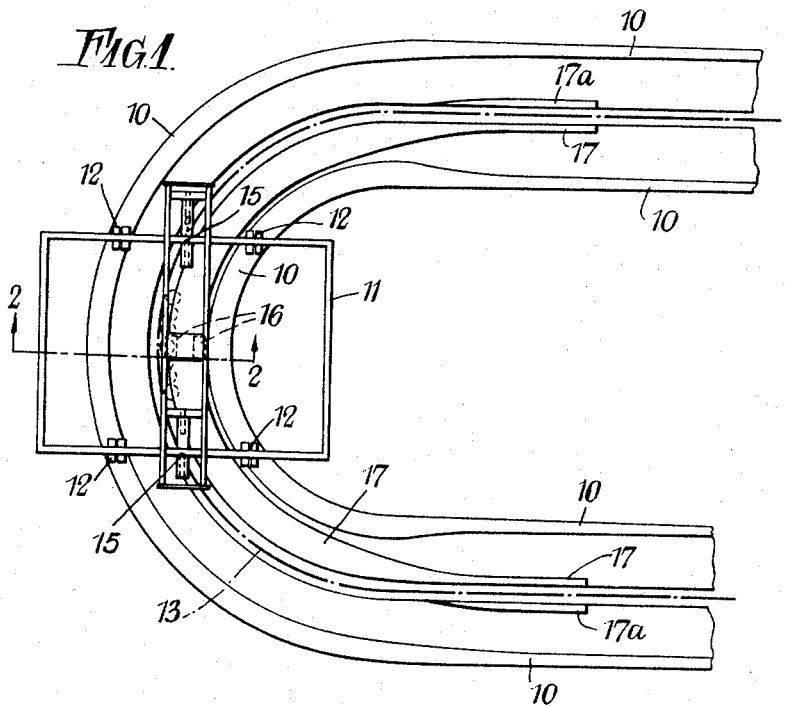
Figure 2:
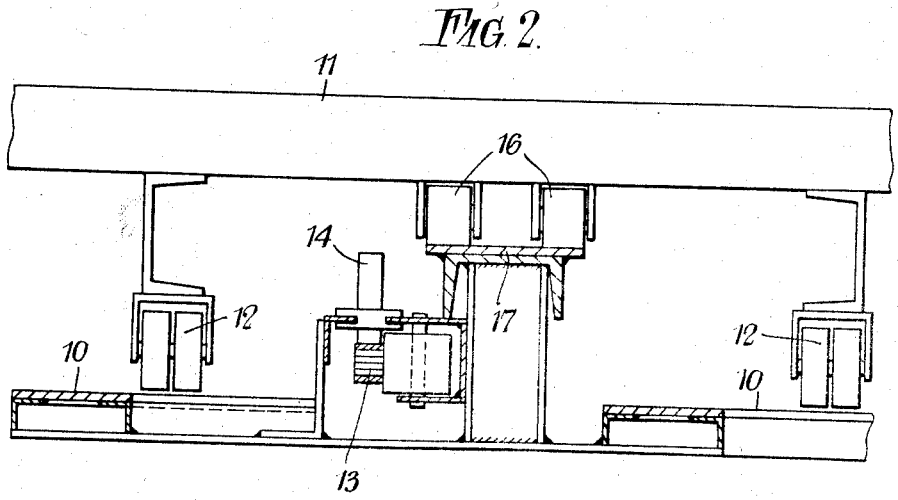

In order that the invention may be clearly understood, it will be more fully described hereinafter with reference to the accompanying drawings, in which:

Figure 1 is a plan view illustrating a portion of a floor conveyor track incorporating a substantially U-shaped bend therein; and Figure 2 is a section on the line 2—2 of Figure 1.

In floor conveyor systems, which include spaced, substantially parallel plate like tracks which are disposed at or near floor level for providing running surfaces for the wheels of load carrying trucks, it is often necessary, as for example, when the load trucks are required to be moved to and fro through the confined space of a paint oven, to incorporate a number of relatively sharp bends in the tracks. In Figure 1, wherein 10 denotes the wheel tracks, one substantially U-shaped bend is illustrated.

In Figure 1, one type of truck such as may be used on a floor conveyor is illustrated. Truck 11 is provided with four non-swivelling support wheels 12, the nearside wheels being aligned to run on an inner track 10 while the offside wheels are aligned to run on the outer track. To propel the trucks, an endless driven chain 13 is disposed within a channelled track located between the tracks 10 and dogs 14 projecting upwardly from said chain and are adapted to engage means designated generally by 15 on the truck chassis in such a manner that the track can be propelled in either direction along the tracks 10 according to the driving direction of the chain. Such a conveyor, as so far described, is known and will not be described further herein. If further information is required regarding the manner in which a drive is imparted to the trucks, reference may be made to prior patent application Serial No. 647,387.

Disposed beneath each truck, preferably at a position near the center of gravity, is a pair of rollers 16 mounted for free rotation about a common axis which is parallel to the axes of the truck wheels 12. In place of the two rollers a single roller may be provided or alternately the rollers or roller may be replaced by a rolling device in the form of one or more balls or wheel castors.

To co-operate with the truck rollers 16, a stationary ramp 17 is provided which is disposed between the tracks 10 and extends completely around the bend from a central position between the tracks before the latter enters the bend, to a similar position between the tracks after the latter has straightened out from the bend. As will be clearly seen in Figure 1, the ramp 17 is eccentrically located between the tracks as it passes around the bend, the arrangement being such that it will coincide with the path of the rollers 16 as the truck passes around the bend. The ramp 17 is designed to provide only a very small lift so that, when the rollers 16 run up onto the ramp immediately prior to the entry of the truck into the bend, the truck wheels 12 are lifted sufficiently from the tracks 10 to transfer the main weight of the truck to the ramp 17 through the rollers 16. It may be that the truck will tilt slightly at one or the other end so that the front or rear wheels 12 maintain contact with the tracks, but this will be unimportant provided that the main weight of the truck is taken by the ramp 17. Thus, when the truck runs out of the bend, and the rollers 16 leave the ramp 17, the truck wheels 12 will only have to be lowered a very small amount to regain four point contact with the tracks 10. As will be seen from Figure 1, in order to allow free passage of the driving dogs 14 on entry and exit to and from the bend, it will be necessary at such entry and exit zones to cut away the ramp 17 and to provide an additional strip or running surface 17a on the opposite side of the chain track in order to provide a stable running surface for the rollers 16.

The effect of the ramp and roller arrangement as described is to reduce the translational drag considerably due to friction which would otherwise be transmitted through the non-swivelling truck wheels 12 while the truck is negotiating the bend. There will, of course, be some translational drag due to friction on the rollers 16 insofar as the latter will have to move inwards towards the inside track 10 as the truck approaches the center of the bend, but this is not sufficient in practice to affect the efficiency of the conveyor. In Figure 1, the position which the truck and the rollers 16 will occupy when the truck is at the center or mid-point of the bend is indicated. If considered necessary or desirable the translational drag might be further minimized by disposing translatory rollers in the support path provided by the ramp with their axes lengthwise of the ramp, to aid the translational movement of the truck rollers. Another way to reduce the translational drag on the truck roller is to grease the ramp, but it will be appreciated that, in cases when the conveyor is employed, for example, in paint ovens, the use of grease is impractical. Yet another way of decreasing translational drag on the truck roller would be to mount roller support tongues at appropriate positions on the ramp to hinge about substantially vertical axes so that translational movement of the truck roller will be absorbed by a pivotal movement of an underlying tongue.

As a final possibility, the truck rollers may be lightly centered by springs so that the truck can move transversely in relation to the rollers while the bend is being negotiated, the rollers then maintaining an approximately central position while negotiating the bend.

While there has been described what is at present considered the preferred embodiment of the invention, it will be obvious to those skilled in the art that various changes and modifications may be made without departing from the scope of the invention.

I claim:

1. In a floor conveyor comprising a trackway formed by a pair of running surfaces disposed in spaced parallel relation and an endless driving chain disposed between said surfaces and having upstanding driving abutments adapted to engage trucks which are supported on non-swivelling rollers running on said surfaces, the provision of means for facilitating the passage of trucks round any appreciable bend in the track such means comprising roller means at the underside of each truck and at substantially the center of gravity thereof and a fixed ramp located between said running surfaces to extend around the bend in the track, said ramp being inclined so that as a truck enters the bend the roller means at the center of gravity of the truck will engage and run on the ramp thereby to cause the truck to be lifted so that the main weight of the latter will be transferred from the non-swivelling rollers to said roller means.

2. A floor conveyor as claimed in claim 1 in which the roller means comprise a pair of rollers freely rotatable about a common axis which is parallel to the axes of the non-swiveling rollers.

References Cited in the file of this patent

UNITED STATES PATENTS

| | | |
|---|---|---|
| 1,149,647 | Harwood | Aug. 10, 1915 |
| 1,869,743 | Geiger | Aug. 2, 1932 |